INVENTOR
Peter James

BY Jacobi & Davidson

ATTORNEYS

| No. or Command | Output | Key |
|---|---|---|
| 1 | f1—f5 | 1 |
| 2 | f1—f6 | 2 |
| 3 | f1—f7 | 3 |
| 4 | f2—f5 | 4 |
| 5 | f2—f6 | 5 |
| 6 | f2—f7 | 6 |
| 7 | f3—f5 | 7 |
| 8 | f3—f6 | 8 |
| 9 | f3—f7 | 9 |
| 0 | f4—f6 | 0 |
| + | f7 | 6—9 |
| − | f5 | 4—7 |
| X | f2 | 4—5 |
| ÷ | f6 | 5—8 |
| Clear | f3 | 8—9 |
| Total | f1 | 2—3 |

INVENTOR

Peter James

BY Jacobi & Davidson

ATTORNEYS

United States Patent Office 3,381,276
Patented Apr. 30, 1968

3,381,276
COMPUTER SYSTEMS

Peter James, Forestville, Md., assignor to Photo Magnetic Systems, Inc., Washington, D.C., a corporation of Maryland Filed Sept. 15, 1965, Ser. No. 487,391
7 Claims. (Cl. 340—172.5)

ABSTRACT OF THE DISCLOSURE

A computer system utilizing standard tone generating telephone sets having a plurality of keys thereon for control of a computer device. Means are provided for interconnecting the telephone set with the computer device, said means producing both data and command signals for the computer device upon individual actuation of the keys on the telephone handset and upon simultaneous action of a group of the keys upon the telephone handset. Thus, complete computer control is effected without resorting to modification of a telephone set.

This invention relates generally to computer systems, and is particularly concerned with a technique for producing computer data and computer instruction or command signals whereby computer services can be made available to virtually any member of the public at entirely reasonable prices.

The use of computer services has spread widely in recent years, but still severe limitations are placed on such services because of the complexity of handling information to be fed to a computer and/or because of the comparatively high costs associated with computer use. Initially, only large corporations, associations, or the like were able to afford computer services because of the costs of the computer itself and the necessity of having one's own computer for convenient utilization in any business operation. Even then, data processing thereby presented inconveniences and complexities in delivery of information to the computer. With further development, time-sharing plans developed whereby several organizations could effectively utilize a single computer by sharing the available time thereof. With the time-sharing arrangements, computer services were made somewhat less expensive and, in turn, became available to a larger segment of the public because the cost of the computer itself could be assessed against a number of users, either directly or indirectly, and thus, time-sharing plans met with considerable success. However, these plans required that data be physically delivered to a given location and/or that special equipment be placed in a user's business location in order to transmit data to and control the computer. Thus, while there was a reduction in costs with time-sharing plans, the cost was still of a sufficient magnitude to preclude the use of computer services by any widespread segment of the public.

In an endeavor to make computer services available to a more widespread population, consideration has been given to the possibility of utilizing an available communications system for purposes of feeding data and instruction or command signals to a computer. In this regard, it was suggested that telephone systems be utilized to control computer operation. It was realized that certain types of telephones, at least, such as the so-called "push button" or "touch tone" telephone sets as now manufactured by American Telephone and Telegraph Company, developed frequency signals corresponding to the numbers 0–9, and that these frequency signals might be used for data and command inputs to a computer system. More specifically, it was contemplated that any number from 0–9 could be fed to the computer as data by merely utilizing the available telephone switching matrix arrangements, and that commands or instructions could be given a computer by using a particular sequence of numbers, e.g., 1–1, 2–3, etc. However, adopting this approach presented its problems from the performance standpoint as well as from the user's standpoint.

By way of simple example, assume that a user wished to add 111 and 236. This data could be fed to the computer by depressing the "1" button three times in quick sequence and similarly, by thereafter pressing the "2," "3," and "6" buttons in quick sequence. Yet, to separate the respective numbers, some control or indicating signal had to be given the computer so that it knew it was not receiving the number 111236, and further an instruction signal had to be given the computer to perform the addition. If "2–3" was the instruction signal, means had to be provided so that the computer realized that 2–3 was an instruction rather than a data or information bit. At the user's end of the line complications are faced with this arrangement. Either the telephone set had to be specially designed or an auxiliary piece of equipment had to be provided at the user's location, and in either event the user had to follow a relatively complicated instruction program to obtain the result desired. Specifically, with this approach, the user's end of the line had to be designed to meet the operational aspects of the computer at the other end of the line. The complications at both ends accordingly presented obstacles which made prior proposed telephone feed and control arrangements unsatisfactory for extensive utilization.

There thus remains a need for a simple and efficient technique which will make computer services generally available at minimum costs to virtually any segment of the population, and the primary object of the present invention is to satisfy this need. More specifically, but still in a broad sense, it is an object of the invention to provide a computer technique which permits large segments of the public to avail themselves of computer services through the use of existing equipment and by manual operations at the user's end well within the capability of the average working person. Viewed with respect to prior developments, therefore, it is an object hereof to provide a system and/or technique (a) which does not require a user to possess a computer or any other special piece of equipment; (b) which, if desired, lends itself to a time-sharing plan so as to minimize costs; (c) which operates with existing communication networks; and (d) which permits computer data and command feed with sufficient simplicity to enable virtually any member of the public to easily obtain from the computer the result which he desires. Going one step further, but a critical step at that, it is an object hereof to satisfy all of the preceding requirements while maintaining the costs at a minimum and well within the feasible range for even a small business operation or individual. Additionally, an important aspect of the invention is to provide an information feed technique for any computer, whether special or general purpose, which even lends itself to operation in large operations where a computer is available without time-sharing, so as to greatly facilitate use of the computer by any participant in the operation.

The use of the ordinary telephone for data and command inputs for a computer presents a practical starting point, but as indicated above, the mere use of a telephone is insufficient to achieve all of the prerequisites for a completely satisfactory commercial operation. Thus, while the invention contemplates (a) the use of an existing communications network, such as the available telephone system for delivering information to, and receiving information from a computer, and (b) the use of "push button" and/or "touch tone" telephone sets as sources of data and command signals, the invention departs from the prior art in its operational technique of handling the data and command signals.

In the conventional "touch tone" telephone, ten buttons are presently provided. These buttons are arranged in four horizontal rows and three vertical rows respectively. While this arrangement could be changed to twelve or sixteen buttons, or even more sophisticated designs without departing from the scope and spirit of the present invention, it is helpful to consider the arrangement as now used to facilitate an explanation of the invention and further, to demonstrate the manifest simplicity and applicability of the invention with existing telephone units.

With the existent arrangement, the four horizontal rows of push buttons include 1–2–3, 4–5–6, 7–8–9, and 0, respectively. The three vertical rows include 1–4–7, 2–5–8–0, and 3–6–9 respectively. The operation is such that for any button pushed in any horizontal row, a given frequency appears on the output and similarly, for any button pushed in any vertical row, another given frequency appears on the output. If the frequencies are considered to correspond to row numbers, then, for example, F–1 represents the first horizontal row, F–2 the second horizontal row, F–3 the third horizontal row, and F–4 the fourth horizontal row. F–5 represents the first vertical row, F–6 the second vertical row, and F–7 the third vertical row. Accordingly, when push button 1 is depressed, F–1 and F–5 appear on the output since button 1 is in the first horizontal row and also in the first vertical row. Similarly, when push button 2 is depressed, F–1 and F–6 appear on the output since push button 2 is in the first horizontal row but the second vertical row. There are thus two frequencies produced at the output for any given number from 0–9.

The invention makes use of the foregoing and further realizes the potentiality of producing differing signals in the event that two or more buttons are pushed simultaneously. While a multiplicity of differing frequency relationships and/or frequencies can be obtained depending on the number and arrangement of buttons that may be simultaneously depressed, simple computer control consistent herewith for several different functions merely requires simultaneous depression of two buttons. More particularly, it has been found that with the conventional touch-tone telephone set, simultaneous depression of two buttons in any given row causes but one frequency in useable form to appear at the output. For example, if the buttons 1–2 are depressed simultaneously, then only F–1 appears in useable form at the output, with the corresponding frequencies for the respective first and second vertical rows, namely, F–5 and F–6, essentially nullifying one another.

With the existing equipment, therefore, we have a situation where for any number from 0–9, conventional operation of the touch-tone set produces simultaneously two frequencies at the output representing the number in question. Moreover, if any two buttons in the same row are simultaneously depressed, only one frequency appears at the output. The invention provides a technique which first realizes this capability and which secondly makes use thereof.

More specifically, with a simple preferred embodiment hereof, data is generated through conventional use of the touch-tone telephone set such that two frequencies simultaneously appear at the output, which two frequencies correspond to a given digit (i.e., 0–9). With this same embodiment, command signals are generated by simultaneous depression of two buttons in a single row and these signals, as explained above, comprise but one frequency. Accordingly, two frequencies appearing simultaneously at the output represent data and one frequency represents a command or instruction.

It is important to realize that in accordance with the preceding, and thus in accordance with the invention, any given piece of data and any given instruction or command is represented by an instantaneous signal rather than by a succession or series of signals. For commands, the single signal consists of one frequency according to the preceding example whereas for data, the single signal consists of two frequencies, but still the signal, while composite in nature, is instantaneous. The single signal technique is an important aspect of the invention since it permits a user to only perform one manual operation for each piece of data and each command to be given the computer. Furthermore, this technique yields an unlimited number of single signals which can be produced merely by varying the number and particular button or buttons depressed. Even further, and for more sophisticated units, the technique adapts itself to automatic devices for controlling the depression of the conventional touch-tone telephone set keyboard.

Since such a telephone has been found to operate in such a manner that normal dialing operations can be carried out to connect the phone with a given remote location (particular telephone number), the operator or user need merely dial the computer as he would dial any other number. Having established this connection through the existent telephone network and switching matrix arrangements, further operation of the push buttons only results in producing "tones" on the line. The connection remains established until the receiver is replaced on the base of the set to effect a "hang-up" operation. Accordingly, once the connection has been made, the user can operate the push buttons to feed data and commands to the computer.

Just providing the aforesaid technique wherein a conventional touch-tone telephone set is used in such manner that both data and instructions or commands are fed to a computer in the form of single signals represents in and of itself a significant advance in the art because it considerably simplifies operations at the user's end of the line without substantially complicating operations at the computer end of the line. Still, absent a further aspect hereof, the basic technique may require some experience on the part of the user in order to properly feed information to and instruct the computer since it is necessary for the user to properly assimilate the instructions to obtain the desired result from the computer.

The invention overcomes the necessity for experience, and thus renders computer control readily available to an average member of the public, by providing at least one, and if desired, a plurality of instructional command devices, preferably in the form of a card or sheet adapted to be disposed in overlying relation to the keyboard on the base of a telephone set with the push buttons operatively extending therethrough. In particular, consistent with the invention, and for manual operations, the user preferably has an apertured card which he can place on the keyboard in operative association with the push button so that the push buttons are exposed therethrough and available for normal operation. On such card, areas overlapping two buttons are appropriately marked by color, indicia, or both, so that an operator immediately knows what two buttons to push simultaneously to effect any given command to a computer. For example, if the computer is programmed to perform an addition operation when the buttons 1–2 are depressed simultaneously (i.e., when frequency F–1 only appears on the line consistent with the above example) then an area or other indication on the card or overlay would immediately tell the user that for addition such two buttons are to be depressed. For subtraction, multiplication, division, etc. areas or indicia on the card would instruct the user which other groups of two buttons were to be depressed simultaneously. In other words, for manual operation, the invention provides an overlay which is adapted to be operatively associated with the keyboard on the conventional touch-tone telephone set to give a user an immediate and instantaneous visual instruction of the command which is to be fed to the computer to perform a given operation.

From the standpoint of end result desired, it is contemplated that at the computer end of the system, answering information corresponding to the result of the problem fed to the computer would be delivered to the telephone line and in turn to the user in audio form so that the user would secure a vocal answer to his problem. Even further, the computer system can produce any one of a virtually unlimited number of different outputs—e.g., a printed record, a vocal answer, a stored information bit or bits, etc., and combinations thereof, and/or if desired, a digital output or even visual display can be provided at the user's end.

While the form and type of output can be varied, the more significant aspect of the invention from the standpoint of the instant specification resides in the fact that the conventional touch-tone telephone set, as presently installed at the user's location is available for telephone communications just as it was so available for such communication initially, and as further available without modification for computer service. There is absolutely no detraction from the telephone set itself or the uses to which it can be put by the invention hereof. On the contrary, normal telephone operation is fully utilized for the purpose of connecting the user with a computer merely by "dialing" a number in the normal fashion. However, once a connection with the computer is established, the telephone set itself, without modification or variation, is utilized to both instruct the computer and feed data thereto. For manual operation, the user at most, is merely required to place an overlay in operative association with the keyboard so as to have computer commands instantly available by visual observation.

The invention itself, and in particular, the use of overlays, readily adapts the system for performance of a multiplicity of different types of operations. For example, one overlay and the instructions associated therewith can direct the computer for the basic mathematical operations of addition, multiplication, subtraction and division. On the other hand, merely by providing another overlay, a user can direct the computer to perform another series of functions related to virtually an unlimited number of processes such as bookkeeping, time records, games, purchasing, etc. The computer itself would operate consistent with conventional techniques for information storage, information retrieval, information delivery and the like, or it could be adapted to specialized functions so as to operate systems peculiar to a given user.

The invention will be better understood, and objects other than those set forth above will become apparent, after reading the following detailed description. Such description makes reference to the annexed drawings presenting preferred and illustrative embodiments of the invention.

Figure 1:
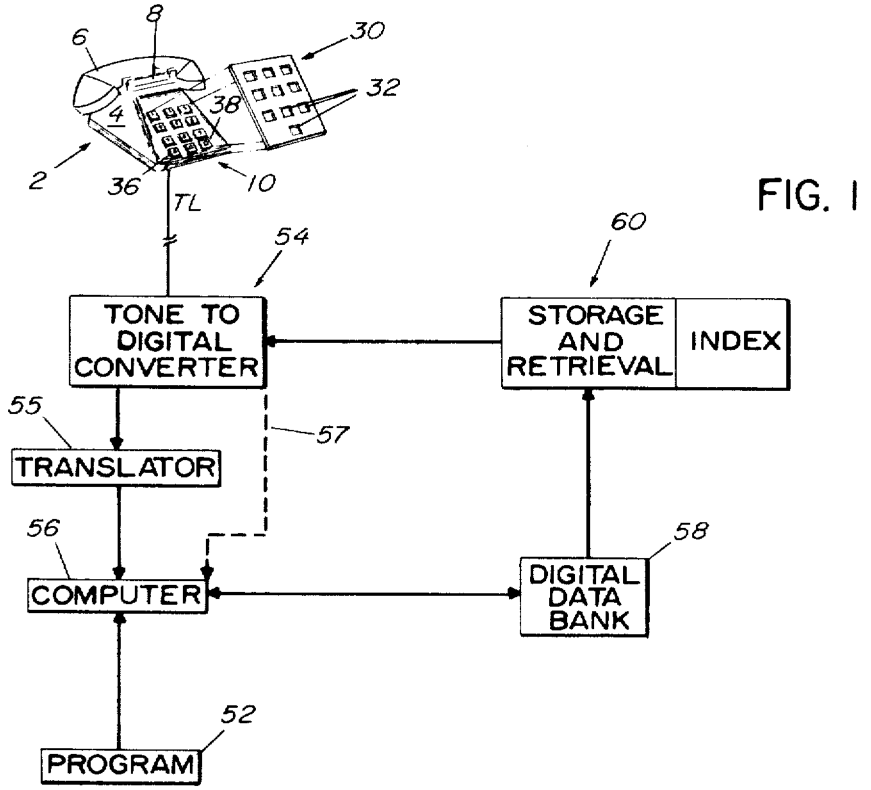
FIGURE 1 is a partially perspective and partially diagrammatic presentation of a system constructed in accordance herewith.

Referring first to FIGURE 1, there is shown therein a conventional touch-tone telephone set 2 including a base 4 and a hand set 6. As customary, the hand set 6 includes a speaker device at one end thereof for reproducing information and a voice transducer at the opposite end thereof for feeding audio signals to the line. The hand set is moreover received in a cradle 8, also of conventional design. The base portion 4 of the telephone set 2 has a keyboard 10 thereon formed by a plurality of push buttons 0–9. This telephone set is made in accordance with U.S. Patents Nos. 3,035,211; 3,076,059; and 3,184,554. However, rather than incorporating 16 buttons, it includes, as shown, only 10 buttons. Still, the operation corresponds to that explained in the aforesaid patents and, in particular, Patent No. 3,076,059, (i.e., the digit calling information is coded by the set in the form of frequencies, with a digit being formed by two frequencies).

Figures 3, 4:
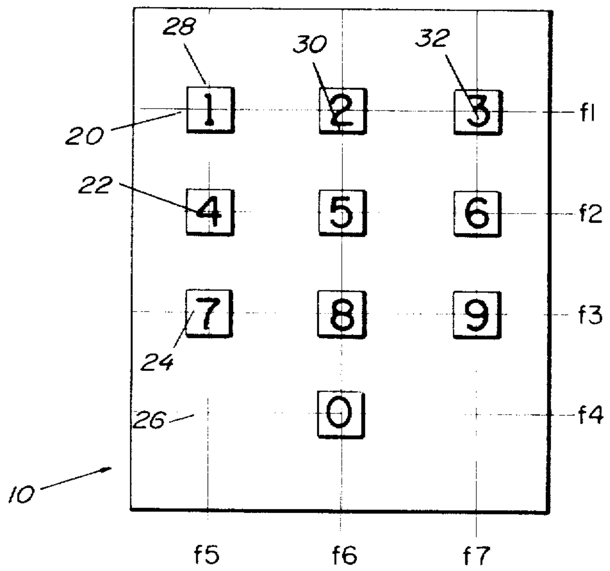
FIGURE 3 is a schematic diagram illustratively presenting frequency relationships between particular digits of a touch-tone telephone set; and, FIGURE 4 is a table presenting data and command information in relation to output frequencies.

To better understand the foregoing, consider FIGURE 3. This figure schematically presents the correlation between digits and frequencies in accordance with a touch-tone telephone set as presently in commercial use in the United States. Basically, an oscillator arrangement (not shown) is used which is capable of producing an output of seven or more frequencies. The frequencies produced correspond to vertical and horizontal rows on the keyboard 10. Thus, a different frequency is produced for each horizontal row, 20, 22, 24 and 26, and similarly, a different frequency is produced for each vertical row 28, 30 and 32. Therefore, if key 1 is depressed, two frequency outputs are obtained, namely, the frequency F–1 produced as the result of depression of a key in the first horizontal row 20, and frequency F–5 produced as the result of depression of a key in the first vertical row 28. Similarly, and to further illustrate such operation, when the key 9 is depressed, the output frequencies are F–3 and F–7 since the key 9 is in the third horizontal row 24 and the third vertical row 32. In FIGURE 4, the outputs are tabulated in accordance with the number key depressed so that one can readily ascertain the outputs corresponding to a given digit. It is important to understand here that these two frequencies are produced simultaneously and thus form a single signal at the output. The user is not in any way concerned, however, with this coding and instead the same is automatic by virtue of operation of the touch-tone telephone set.

Similarly, with a touch-tone telephone set as described above, simultaneous depression of two or more keys in any given row, whether vertical or horizontal, results in the output of only a single signal having a peculiar frequency "make-up" characteristic of the particular buttons simultaneously depressed. Referring to the preceding example, if the keys 1 and 2 are simultaneously depressed, only frequency F–1 appears at the output in useable form. Frequencies F–5 and F–6 either nullify one another, so combine with one another as to not be useable, or do not appear at the output. The exact reason for obtaining only a single frequency in the event of depression of more than one key simultaneously is apparently quite complex, and since the reason itself has no bearing on the instant invention, it suffices to understand for this exemplary embodiment of the invention that the operation of the touch-tone telephone set results in having but a single frequency when two keys are simultaneously depressed. For an exact correlation between keys and the single command signals, attention is again directed to FIGURE 4 and the following explanation.

The digital information, in tone form, as developed through normal use of the keyboard 10, is utilized in accordance with the invention to feed data to a computer. On the other hand, the simultaneous depression of two or more keys, i.e., the nonconventional aspect of operation, is used to command or instruct the computer. Where manual operation is desired, an indication device 30 is provided, which indicating device is readily adapted to be operatively associated with the keyboard 10. The indicating device 30 preferably takes the form of a card or sheet having a plurality of apertures 32 therein. The number of apertures and the shape thereof corresponds identically to the number of keys and the shape thereof. In this regard, it should be noted that the invention is being explained in connection with a 10-key keyboard. However, the invention is equally applicable with a keyboard having a greater number of keys thereon such as a keyboard including the auxiliary keys 36 and 38 shown in phantom in FIGURE 1. Even further, a 16-key keyboard such as shown in the aforementioned prior patents could be used. Still, a 10-key keyboard as now in commercial use is sufficient for a variety of operation of a computer following the teachings of the invention, and accordingly, discussion of more complex keyboards seems unnecessary.

Figure 2:
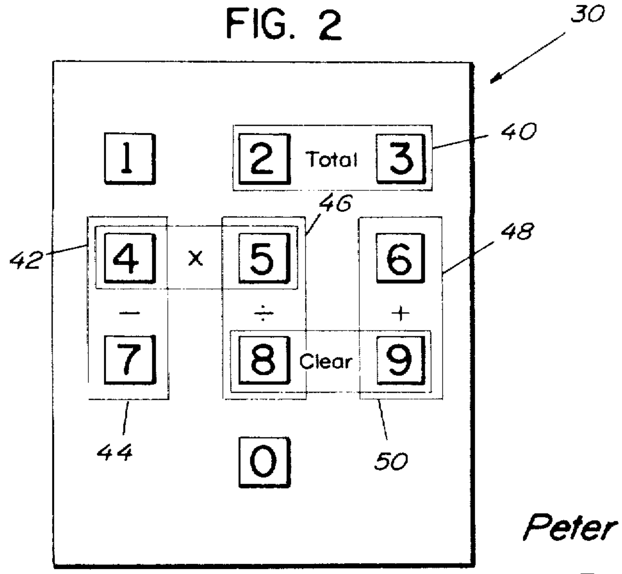
FIGURE 2 is a plan view of an instruction device or overlay adapted to be used in accordance herewith.

The indicating device 30, as shown in FIGURE 2 preferably has a number of coded areas 40, 42, 44, 46, 48 and 50 thereon. The area 40 encompasses keys 2 and 3 and, for purposes of example, denotes a "TOTAL" instruction. Similarly, area 42 encompassing keys 4 and 5 denotes a multiplication instruction, area 44 encompassing keys 4 and 7 denotes a subtraction instruction, area 46 encompassing keys 5 and 8 denotes a division instruction, area 48 encompassing keys 6 and 9 denotes an addition instruction, and area 50 encompassing keys 8 and 9 denotes a "CLEAR" instruction.

When the indicating device or overlay 30 is placed in overlying relation to the keyboard 10, the keys or push-buttons on the keyboard project therethrough and are depressable in the normal manner. A user can readily "dial" any given number as he would otherwise do. The indicating device merely serves to give an instantaneous visual indication to the user of a command or instruction which he can feed to the computer in the event the touch-tone telephone set is linked with the computer. The indicating device or overlay 30 is readily detachable from the keyboard, and as should be apparent, can be replaced by a similar overlay quite easily.

Again returning to the exemplary system described above, let it be assumed that the indicating device 30 as shown in FIGURE 2 is placed on the keyboard 10 of the touch-tone telephone set 2 shown in FIGURE 1. Assuming the system is otherwise connected in the manner discussed hereinafter, the telephone set 2 is ready for the operations contemplated hereby. Specifically, a user would initially "dial" a number which would be the number for the computer system—the number to connect a telephone at the opposite end with a computer. For this purpose, and assuming that a direct connection into the telephone line is not permitted, a telephone at the computer location would have any one of the number of available answering systems associated therewith so that the telephone at the computer location would be "answered" and the hand set associated therewith would deliver received signals to a suitable input such as a microphone or the like.

The computer could, of course, be directly connected with the telephone line, and as indicated, if not so connected, any form of previously suggested "answering" device could be used so long as it functions to "answer the call" and produce signals corresponding to those fed over the line following completion of the answering operation. A system constructed in accordance herewith could, if desired and through the use of conventional equipment, present a voice message to the user at the other end of the line, or alternatively, it could merely answer the call without voice indication, in either of which events, the user would know that he is ready to perform the data feed and computer instructions.

For simplicity, let it be assumed that the user wishes to perform an addition operation. Let it be further assumed that the computer has been programmed to perform the basic mathematical operations of addition, subtraction, multiplication and division. In this instance, when the user completed his call to the computer, he would initially simultaneously depress keys 2 and 3 on the keyboard of his telephone set so as to total the computer and set it for his own operation. Depression of keys 2 and 3 would result in feeding the frequency F–1 alone to the computer, and consistent with the computer program, the computer would thus be reset for a new operation. It will be noted in FIGURE 1 that a program is shown as being fed to the computer, the program being generally designated by the numeral 52. Similarly, at the computer location, a tone to digital converter 54 and a translator 55 serve to convert the tone signals or frequencies as fed over the line TL into digital information suitable for the computer's use. The tone to digital converter comprises a conventional type of matrix switching arrangement such as, for example, Data Set Model 401–J or Model 403–A, as produced by American Telephone and Telegraph Company and disclosed in Bell System Data Communications Technical Reference—Data Set 401J Interface Specification—September 1965. Converter 54 gives an output which is translated by any conventional translator and fed in useable form to the computer itself, 56. The only essential requirement for the translator is that it is compatible with both the tone to digital converter and the computer. The computer preferably has a digital data bank 58 operatively associated therewith and also a further bank 60 including an indexing section and a storage and retrieval section. The computer 56 and the banks 58 and 60 can operate in conventional fashion to perform the desired operations to resolve a given problem. Preferably, however, the storage and retrieval section includes stored voice signals which can be indexed for convenient retrieval and then fed back through the line TL via the tone to digital converter networks, if desired (in which event, aforesaid Model 403–A could be used).

Returning to the exemplary operation, after the user has "dialed" the telephone number for the computer and has fed the total instruction or command thereto, i.e., the instruction resulting from simultaneous depression of keys 2 and 3, the user can then feed the numbers to be added. Again, by way of example, if the number 123 was to be added to the number 456, the operator or user would depress the keys 1–2–3 and thereafter simultaneously depress keys 6 and 9 to indicate that addition was to be performed and the next number was about to be fed. Then the operator would depress keys 4–5–6, and thereafter depress keys 2–3 to instruct the computer to give a total. The computer would then carry out the desired operations and produce an output corresponding to the number 579, the total of the two numbers being added. With a voice return, the user would hear 5–7–9 and thus would have the answer at hand. The same type procedure would be followed for other operations, with only the digits and instructions differing to obtain a particular result.

The preceding example and the embodiment described is quite simple but it clearly illustrates the basic technique contemplated by the invention, namely, a technique wherein an existing touch-tone telephone set is utilized to connect the user with the computer, and wherein single signals are developed therewith to feed data to the computer to instruct the computer. All the single signals are available from a conventional piece of equipment, and the user being provided with the indicating device, knows the instructions instantaneously through visual observation of the indicating device or overlay operatively associated with his telephone set and carrying instruction information correlated to the computer program. No coding or decoding on the part of the user is required.

While the illustrative embodiments and example described above is very basic and very simple, those even remotely familiar with the art should readily appreciate the diverse potentiality and capability of the technique provided by the invention. Quite obviously, a multiplicity of different computer operations can be readily performed with the very basic 10-key touch-tone telephone set. If a more sophisticated telephone set is available, the number of operations which can be performed increases and the potential capabilities of the system is expanded. Furthermore, even with the basic 10-key set, devices can be associated therewith to operate as many keys as desired simultaneously for a given operation so as to develop a single signal having a characteristic frequency or frequencies for a prescribed operation. The invention is thus not limited to the simple embodiment shown in the drawings and described above, but is instead applicable in any instance where the basic technique can be employed.

From the terminology standpoint, the telephone set referred to above has been designated by its common name "touch-tone" and/or "push button" telephone set. However, for accuracy, the same can be appropriately called a tone generating telephone set. Similarly, while the term "computer" has been used above, the invention might be more accurately described in terms of a computer mechanism or computer arrangement. In this regard, the computer network or arrangement includes the tone to digital converter 54, the translator 55, the computer 56, the respective banks 58 and 60, and of course, a desired program or series of programs. Such computer mechanism is then frequency responsive. It will be understood that as opposed to using "hardware" in the form of a translator, so-called "soft-ware" can be incorporated in the computer whereby the tone to digital converter can feed directly to the computer, as for example, indicated by the phantom link 57 shown in FIGURE 1. The term computer and/or computer mechanism and/or computer arrangement as used herein refers to the more commonly known computers such as the IBM 360, the Punch Card IBM 026, and the Univac 1108, as well as to calculators, graphic processors (e.g. processors such as disclosed in James U.S. Patent No. 3,075,178) low speed xerographic reproducers, facsimile devices, graphic plotters, data displays, and other devices adapted to perform general or specific functions upon receipt of data, instructions or commands, and combinations thereof.

The details of the computer mechanism or arrangement will be varied depending upon the particular operation desired so that, as indicated, the computer might be either a general purpose or special purpose computer. Regardless of the type computer and of the particular construction thereof, the invention is in any instance adapted to control the same. At most, a modification of the translator is required so as to translate the instantaneous frequency signals into a signal form acceptable to the computer. In other words, the invention views the operation from simplicity of data and command feed at the user's end, thus affording widespread application with minimum costs and facility in operation. The telephone set, consistent herewith, offers the required operational characteristics in that it functions as a key operated frequency generator. The telephone lines utilized, or other communications network, can be public or private and even further in an overall arrangement, present dial phones, including rotating discs, can be used as auxiliary means to supply a computer with particular information to be handled later according to instructions from a touch-tone telephone set operating in the manner described above.

After reading the foregoing detailed description, it should be apparent that the objects set forth at the outset of this specification have been successfully achieved.

I claim:

1. A computer system comprising:
- a frequency responsive computer arrangement including a computer device disposed at a first location;
- at least one tone generating telephone set disposed at a second location, said telephone set having a plurality of keys thereon, said keys being operative when actuated individually to produce first single signals having different frequency characteristics corresponding to the particular key actuated and being operative when actuated simultaneously in groups to produce second single signals having still different frequency characteristics corresponding to the particular group of keys simultaneously actuated; and,
- means coupling said telephone set to said computer arrangement;
- said computer arrangement being responsive to signals having both said frequency characteristics to cause said computer device to receive data and be commanded in accordance with said signals.

2. A computer system as defined in claim 1, wherein said first single signals comprise multiple frequency components and wherein said second single signals comprise single frequency components.

3. A computer system as defined in claim 1, wherein said computer arrangement includes a tone-to-digital converter means for converting said signals having said frequency characteristics into digital information.

4. A computer system as defined in claim 3 wherein said computer arrangement includes translator means for translating said digital information into data and commands for said computer device.

5. A computer system comprising:
- at least one tone generating telephone set having a plurality of keys thereon;
- a computer device; and,
- means interconnecting said telephone set with said computer device, said means producing data and command signals for said computer device upon individual actuation of said keys and upon simultaneous actuation of a group of said keys.

6. A computer system as defined in claim 5, wherein said means includes a tone-to-digital converter and a translator device.

7. A computer system as defined in claim 6, wherein command signals are produced for said computer device upon simultaneous actuation of a group of said keys and wherein data signals are produced for said computer device upon individual actuation of said keys.

References Cited

UNITED STATES PATENTS

| | | | |
|---|---|---|---|
| 2,933,563 | 4/1960 | Hohmann | 179—18 |
| 3,076,059 | 1/1963 | Meacham et al. | 179—84 |
| 3,158,317 | 11/1964 | Alexander | 235—145 |
| 3,184,554 | 5/1965 | Meacham et al. | 179—84 |
| 3,187,321 | 6/1965 | Kameny | 340—172.5 X |
| 3,200,192 | 8/1965 | Auwaerter et al. | 340—172.5 X |
| 3,240,427 | 3/1966 | Holman | 235—145 |
| 3,299,210 | 1/1967 | Bandy | 179—2 |
| 3,301,957 | 1/1967 | Germond et al. | 179—2 |
| 3,334,190 | 8/1967 | Jenkins et al. | 179—18 |

OTHER REFERENCES

Hibbard et al.: IBM Technical Disclosure Bulletin, "Terminal Operator Summons Signal," vol. 3, No. 2, July 1960, pp. 20–21.

PAUL J. HENON, *Primary Examiner.*